United States Patent
Gillis et al.

[11] Patent Number: 6,084,753
[45] Date of Patent: *Jul. 4, 2000

[54] METHOD AND APPARATUS FOR REMOVING DEBRIS FROM A SLIDER IN A DISK DRIVE USING LOAD/UNLOAD TECHNOLOGY

[75] Inventors: Donald Ray Gillis, San Jose; Mike Suk, Milpitas, both of Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,185

[22] Filed: Jan. 2, 1997

[51] Int. Cl.[7] ................. G11B 5/41; G11B 5/54; G11B 33/14
[52] U.S. Cl. .................. 360/128; 360/97.02; 360/105
[58] Field of Search ................. 360/128, 105, 360/97.02, 97.03, 97.04

[56] References Cited

U.S. PATENT DOCUMENTS

| | | | |
|---|---|---|---|
| 3,881,734 | 5/1975 | Leedom | 369/71 |
| 4,046,384 | 9/1977 | Kirschner | 369/71 |
| 4,285,524 | 8/1981 | Hughes et al. | 369/71 |
| 4,408,315 | 10/1983 | Mehrotra et al. | 369/71 |
| 4,450,548 | 5/1984 | Hughes | 369/71 |
| 4,510,541 | 4/1985 | Sasamoto | 360/128 |
| 4,870,703 | 9/1989 | Augeri et al. | 360/105 |
| 5,034,835 | 7/1991 | Yokoyama | 360/97.02 |
| 5,189,575 | 2/1993 | Onooka et al. | 360/128 |
| 5,204,793 | 4/1993 | Plonczak | 360/105 |
| 5,212,679 | 5/1993 | Tonkairin | 360/97.02 |
| 5,237,477 | 8/1993 | Hodapp et al. | 360/128 |
| 5,379,171 | 1/1995 | Morehouse et al. | 360/105 |
| 5,467,238 | 11/1995 | Lee et al. | 360/128 |
| 5,486,970 | 1/1996 | Lee et al. | 360/128 |
| 5,768,059 | 6/1998 | Bishop et al. | 360/128 |

FOREIGN PATENT DOCUMENTS

| | | | |
|---|---|---|---|
| 56-22209 | 3/1981 | Japan | 360/128 |
| 58-147817 | 9/1983 | Japan | 360/128 |
| 59-30225 | 2/1984 | Japan | 360/128 |
| 60-219603 | 11/1985 | Japan | 369/71 |
| 62-67745 | 3/1987 | Japan | 369/71 |
| 63-187413 | 8/1988 | Japan | 360/128 |
| 63-251909 | 10/1988 | Japan | 360/128 |
| 2-50312 | 2/1990 | Japan | 360/128 |
| 4-61612 | 2/1992 | Japan . | |
| 4-298811 | 10/1992 | Japan . | |
| 5-189728 | 7/1993 | Japan | 360/128 |
| 5-314434 | 11/1993 | Japan | 360/128 |
| 6-020295 | 1/1994 | Japan . | |
| 6-236528 | 8/1994 | Japan . | |

Primary Examiner—Craig A. Renner
Attorney, Agent, or Firm—Robert B. Martin

[57] ABSTRACT

The present invention provides a method and load/unload structure for implementation in a disk drive, whereby debris is prevented from accumulating on the surface of an air bearing slider by moving the slider ABS across a stationary cleaning pad formed integrally with the ramp structure during loading and unloading. As a first aspect of the invention, space at the disk perimeter is used efficiently by providing a stationary cleaning surface integral to the ramp structure. As another aspect of the invention, cleaning may be enhanced by dithering the slider across the stationary pad, e.g., at selected resonant frequencies, to remove a larger volume of debris. As yet another aspect of the invention, baffling may be provided in the disk drive interior to channel the airflow generated by the disk such that it is directed over the cleaning pad in the direction of an air filter.

5 Claims, 7 Drawing Sheets

METHOD AND APPARATUS FOR REMOVING DEBRIS FROM A SLIDER IN A DISK DRIVE USING LOAD/UNLOAD TECHNOLOGY

FIELD OF THE INVENTION

The present invention relates generally to rotating disk drives with load/unload ramps and more particularly, to a method and load/unload ramp structure for removing debris from the recording head during loading and unloading.

BACKGROUND OF THE INVENTION

A magnetic storage device typically comprises one or more magnetic disks, each having at least one data recording surface including a plurality of concentric tracks of magnetically stored data, means such as a spindle motor and spindle motor controller for supporting and rotating the disk(s) at a selected RPM, at least one read/write transducer or "head" per recording surface formed on a liquid bearing slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over desired ones of the tracks.

Each slider is attached on one surface to an actuator arm via a flexible suspension and includes on an opposite side a liquid bearing surface (LBS) of a desired configuration to provide favorable fly height characteristics. In contact recording disk drive designs, the slider and transducer are in continuous contact with the storage disk, which may be coated with a lubricant to reduce wear on the slider. In contact start/stop disk drive designs, the slider and transducer are only in contact with the recording surface when the spindle motor is powered down. As the disk begins to rotate, an airflow is generated which enters the slider's leading edge and flows in the direction of its trailing edge. The airflow generates a positive pressure on the LBS, also called an air bearing surface or ABS, lifting the slider above the recording surface. As the spindle motor reaches operating RPM, the slider is maintained at a nominal fly height over the recording surface by a cushion of air. Then at spin-down, fly height drops until the slider is once again in contact with the disk.

Because contact start-stop recording subjects the slider and transducer to extensive wear, some disk drive designs alternatively employ "load/unload" technology. According to this design, a ramp is provided for each slider/suspension assembly at the inner or outer diameter of the disk where the slider is "parked" securely while the spindle motor is powered down. During normal operation, the disk speed is allowed to reach a selected RPM (which may be below the normal operating RPM) before the head is "loaded" onto the disk from the ramp on the liquid or the air cushion generated by the disk's rotation. In this manner, the slider flies over the disk without significant contact with the disk surface, reducing contact start-stop wear substantially.

The sensitivity of the transducer to information in the storage surface increases with decreasing slider fly height. Thus information may be recorded at higher bit and track densities on the recording surface if the fly height of the slider can be maintained in close proximity to the disk. But lower flying altitudes subject the slider ABS to the accumulation of debris which may become lodged in the transducer read and write gaps, impairing data transfer. Debris may be introduced to the disk surface during the manufacture or assembly of the disk drive, from moving parts that wear over a period of time, a faulty air filtering system, or slider contact with disk asperities, for example. The debris may also accumulate along the air bearing surface features, degrading fly height performance. Fly height degradation may be in the form of increased fly height leading to signal loss, or a decrease in fly height leading to "head crash", i.e., impact with the disk. Head/disk impact can cause severe damage to the transducer, slider, and disk coating, resulting in unrecoverable data.

It is therefore desirable to periodically remove head debris. In contact start-stop designs, debris removal is accomplished when the head comes into physical contact with the disk surface. As the slider in contact with the disk, the accumulated debris is scraped off by the disk surface. In load/unload designs, such cleaning is not possible, since the head preferably never comes into contact with the disk.

U.S. Pat. No. 5,486,970 to Lee et al., is directed to a head cleaning apparatus mounted adjacent to a disk comprising a base, a ratchet, and a cleaning pad with bristles rotated by the ratchet in a plane parallel to the plane of the disk. The head is loaded onto the cleaning pad by a ramp, and is cleaned by the rotating bristles. The design is undesirable for small disk drive designs with limited space at the disk perimeter, since sufficient space must be provided to accommodate the rotating mechanism.

What is needed, therefore, is a space-efficient ramp structure and method for removing debris from a slider during the load/unload process so reading, writing, and fly height performance are not adversely affected.

SUMMARY OF THE INVENTION

Accordingly, the present invention provides a method and load/unload structure for implementation in a disk drive, whereby debris is prevented from accumulating on the surface of a liquid bearing slider by moving the slider ABS across a stationary cleaning pad formed integrally with the ramp structure during loading and unloading. As a first aspect of the invention, space at the disk perimeter is used efficiently by providing a stationary cleaning surface integral to the ramp structure. As another aspect of the invention, cleaning may be enhanced by dithering the slider across the stationary pad, e.g., at selected resonant frequencies, to remove a larger volume of debris. As yet another aspect of the invention, baffling may be provided in the disk drive interior to channel the airflow generated by the disk such that it is directed over the cleaning pad in the direction of an air filter.

BRIEF DESCRIPTION OF THE DRAWINGS

The foregoing and other objects, features and advantages of the present invention will be apparent from the following detailed description of the preferred embodiments of the invention, reference being made to the accompanying drawings, wherein like reference numerals indicate like components and in which.

DESCRIPTION OF THE PREFERRED EMBODIMENT

The present invention shall now be described with reference to a preferred embodiment, namely, a ramp structure adapted for use in a disk drive implementing air bearing sliders. It shall be understood that this embodiment is provided for illustration purposes only and is not intended to limit the scope of the invention as defined in the appended claims. For example, the present invention is easily adaptable to contact recording disk drives when it is desired to clean the liquid bearing surfaces of a contact recording slider by periodically unloading the slider from the storage surfaces.

Figure 1:
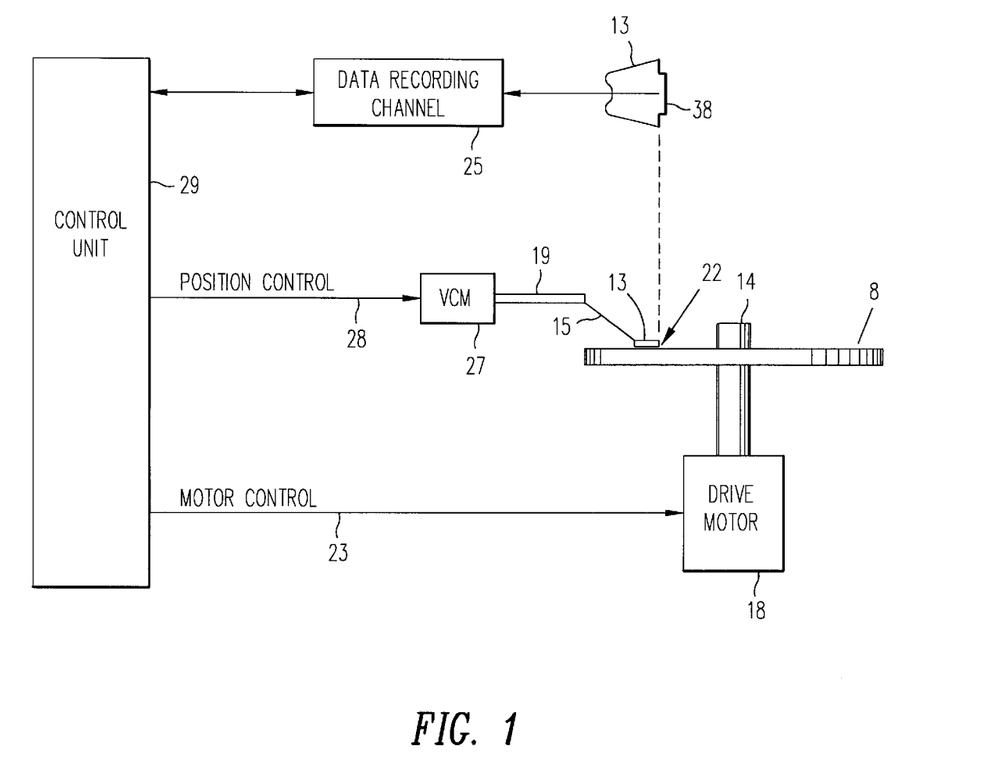
FIG. 1 is a schematic diagram of a magnetic disk storage system useful for practicing the present invention.

Referring now to FIG. 1, a magnetic disk storage system comprises at least one rotatable magnetic disk 8 supported on a spindle 14 and rotated by a disk drive motor 18 with at least one slider 13 positioned on the disk 8, each slider 13 supporting one or more magnetic read/write transducers 38, commonly referred to in the art as read/write heads.

The magnetic recording media on each disk is in the form of an annular pattern of concentric data tracks (not shown) on disk 8. As the disks 8 rotate, the sliders 13 are moved radially or along an arcuate path over the disk surface 22 so that the heads 38 may access different portions of the disk where desired data is recorded.

Each slider 13 is attached on its upper surface to an actuator arm 19 by means of a suspension 15. The suspension 15 provides a slight spring force which biases the slider 13 against the disk surface 22. Each actuator arm 19 is attached to a rotary actuator 27. The rotary actuator as shown in FIG. 1 may be a voice coil motor (VCM), for example. The VCM comprises a coil moveable within a fixed magnetic field, the direction and velocity of the coil movements being controlled by a control signal supplied by a servo system controller.

During operation of the disk storage system, the rotation of the disk 8 generates an air bearing between the slider 13 and the disk surface 22 which exerts an upward force or positive pressure on the lower surface of the slider. This lower or air bearing surface (ABS) typically includes a plurality of air bearing rails shaped to provide desired flying characteristics. The positive pressure generated on these rails counterbalances the slight spring force of the suspension 15 and supports the slider 13 off and slightly above the disk surface by a small, substantially constant spacing during operation. The slider may also include negative pressure regions such as pockets 97 and 97' for counteracting the positive pressure to provide a flatter fly height profile.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 8. Read and write signals are communicated to and from read/write heads 38 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
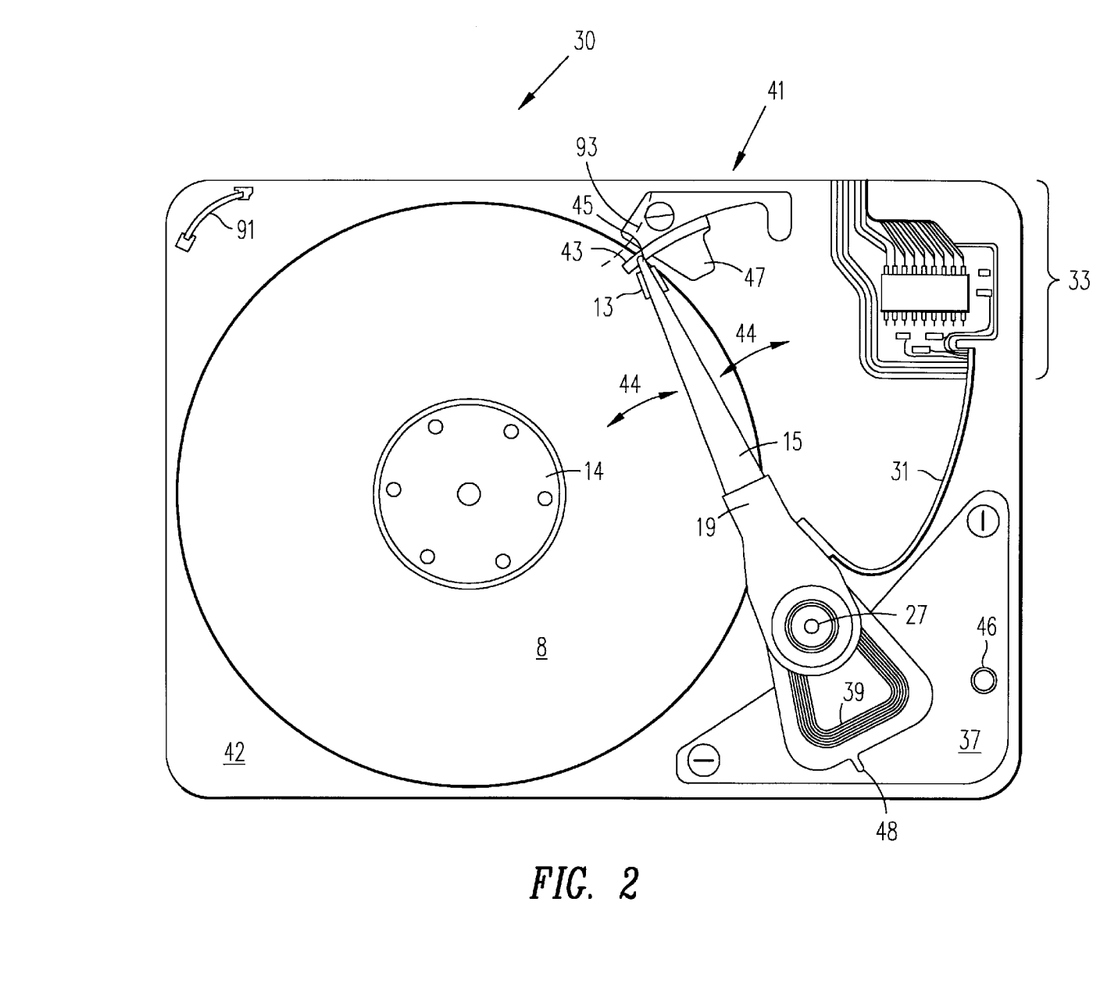
FIG. 2 is a top view of an open rotary actuator disk drive with a load/unload ramp.

FIG. 2 shows a disk drive 30 employing a rotary actuator 27, an air bearing slider 13 with a transducer formed thereon (not shown), and a load/unload ramp structure 41 mounted at the outer perimeter of a storage disk 8. The actuator is coupled to the slider via a suspension 15 which includes a protrusion 45 at its distal end for engaging a ramp 43 of the ramp structure 41 during load/unload operations. During data access operations, the actuator 27 selectively positions the transducer over the disk 8 in response to a control signal from the servo control electronics, which for example may be located on a printed circuit board attached to the base 42 of the disk drive. The control signals and information to be written to the disk 8 are provided to the actuator through a connector circuit 33, which includes an arm electronics module, and along a flexible cable 31. Information read from the disk 8 by the transducer is transmitted through the flex cable 31 and circuit 33 to a read/write channel, also located on the printed circuit board.

The actuator 27 rotates about an axis in the directions indicated by arrows 44. A voice coil 39 is provided at one end of the actuator arm 19 between a pair of permanent magnets, one of which is shown (37). The other magnet is attached to the insider cover of the disk drive enclosure, which has been removed in FIG. 2 for ease of description. The control signal from the servo control electronics causes a current to flow in voice coil 39 and generate a magnetic flux. The flux creates either an attractive or a repulsive force relative to the permanent magnets 37, causing the actuator to move in a desired direction. Actuator movement is limited by one or more crash stops 46 that block the range of movement by coming into contact with protrusion 48. During periods when data access operations are not in progress or when the disk 8 is not spinning, the servo control electronics commands the actuator to move the slider away from the disk and onto the load/unload ramp 43.

Figure 3A:
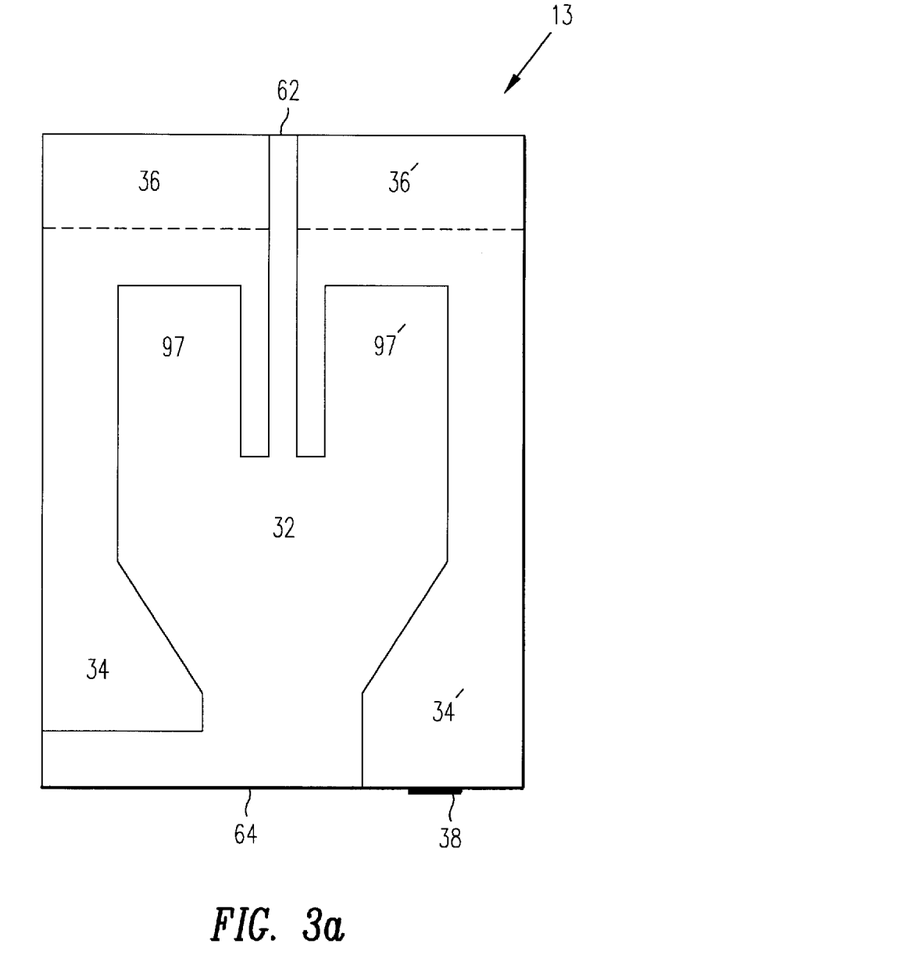
FIGS. 3A and 3B are bottom and side views of an air bearing slider with a side-mounted transducer.
Figure 3B:
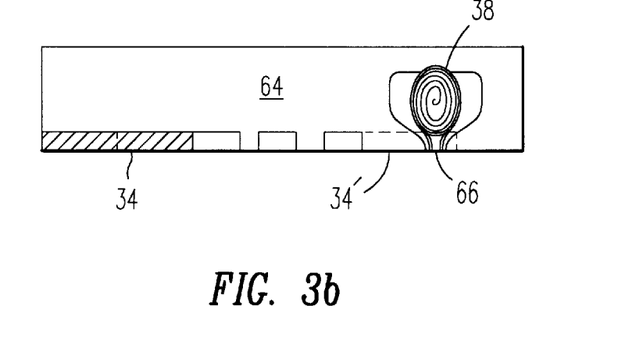

FIG. 3A illustrates an exemplary air bearing surface of a slider 13. Air enters the ABS at the leading end 62, which includes steps or beveled portions 36 for enhanced lift, and exits at the trailing end 64. A transducer 38 is formed at the trailing end 64, which generally flies closer to the disk than the leading end 62. A view of the trailing end 64 and transducer 38 is represented in FIG. 3B. Referring back to FIG. 3A, when the disk is rotating, positive pressure forms on rails 34 and 34' to support the slider at a nominal distance from the disk 8. A recessed region 32 is provided between the rails 34 and 34' and may include negative pressure pockets (formed by rails 34 and 34') to counteract variations in positive pressure.

As the slider flies in close proximity to the disk surface, particles of contaminants or debris can accumulate in the recesses 32 of the slider, at the lower-flying trailing end 64, on the air bearing surfaces 34 and 34', and particularly in the read and write gaps 66 of the transducer 38. The proposed method and apparatus seek to remove such particles from the ABS and gaps 66 before read/write performance and fly height are adversely impacted. Numerous air bearing designs are in use in the disk drive industry today, but all have some features prone to the collection of debris and would benefit from the proposed invention.

Figure 4A:
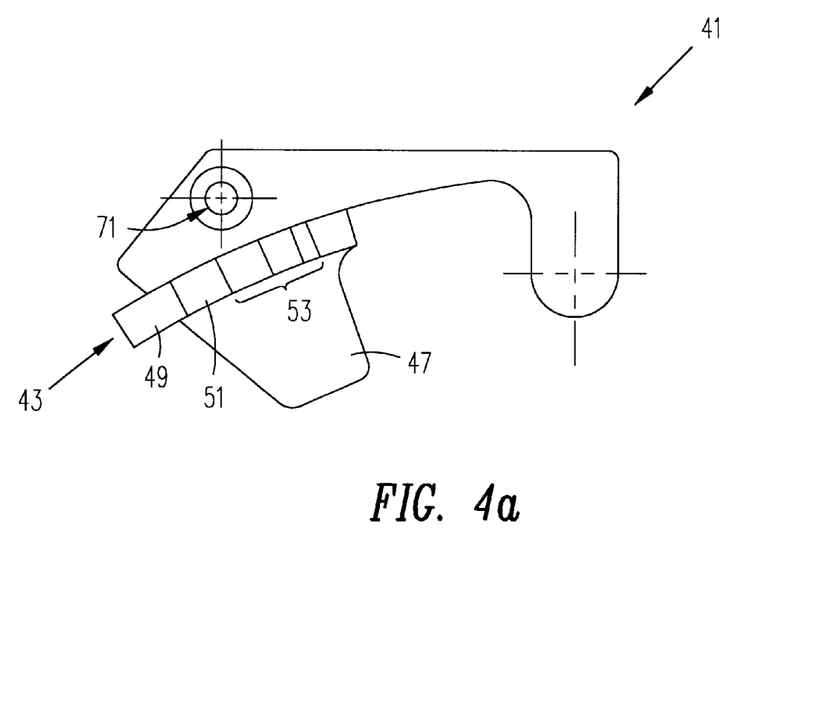
FIGS. 4A and 4B are enlarged top and side views of a load/unload ramp structure.

FIG. 4A shows a top view of a load unload ramp structure suitable for practicing the present invention. The structure preferably comprises a strong and resilient plastic formed by injection molding. The plastic must be resistant to peeling or chipping to avoid contaminating the interior of the disk drive. The structure includes a ramp 43 preferably including a ramped portion 49, a plateau 51, and a detent 53. A planar limiter 47 extends outwardly from the ramp, as shown, such that it is disposed directly below the air bearing surface of the slider when the suspension is "parked" on the ramp. The structure is mounted to the base 42 of the disk drive proximate to the outer perimeter of the disk 8 with a screw or other mechanical means of attachment at hole 71.

During unloading, a protrusion or tab 45 at the distal end of the suspension 15 engages the ramp, traveling up ramped portion 49 and across the plateau 51 before finally coming to rest in detent 53. During loading, a breaking force is applied to the actuator 19 to break the suspension free of the detent 53 onto plateau 51 and move it down the ramp portion 51 before finally loading the slider above the rotating disk surface.

Figure 4B:
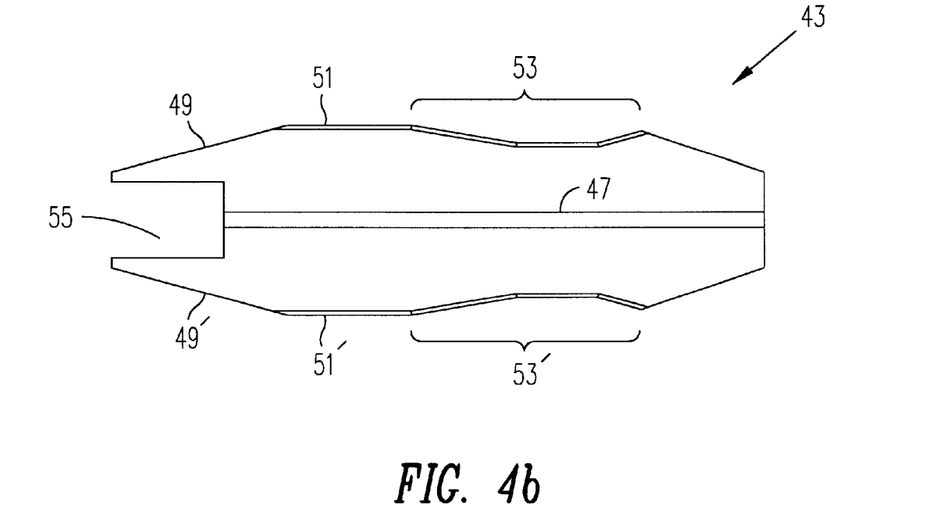

Although FIGS. 1 and 2 only show a single actuator arm with a single suspension 15, actuators are generally provided with a pair of suspensions 15, 15' one corresponding to each surface of the storage disk 8. For this reason, the preferred ramp structure includes a double-sided ramp 43 for each storage disk. A side view of one of these double-sided ramps 43 is shown in FIG. 4B. Gap 55 fits around the storage disk 8 to provide a ramped portion 49, 49' over each surface for engaging the distal end of one of the suspension pair. Each ramped portion 49, 49' leads into a plateau 51, 51' and finally to detent 53, 53'.

Figure 5A:
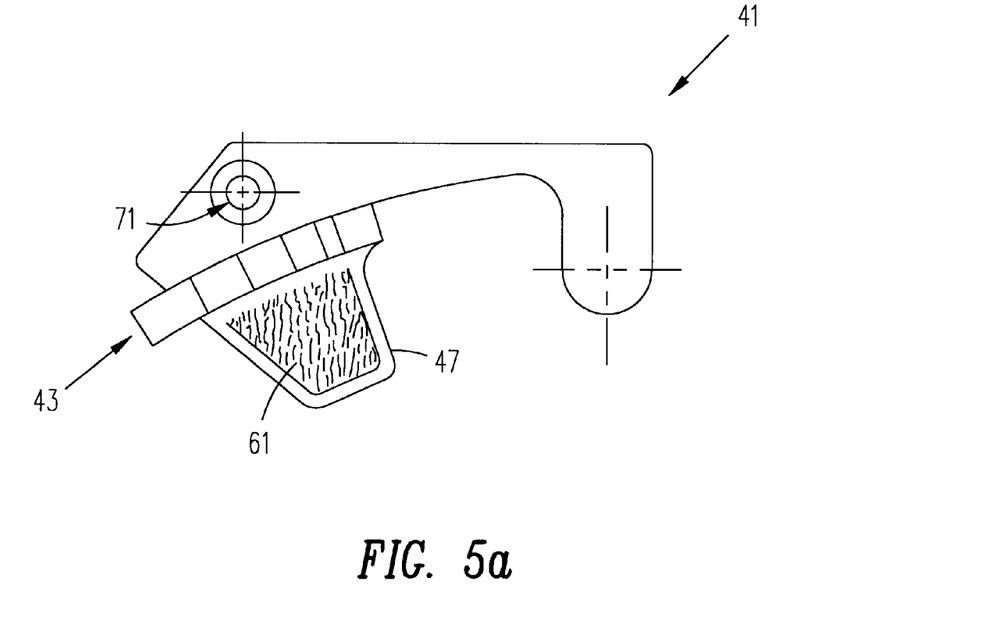
FIGS. 5A and 5B are top and side views of the load/unload structure of FIGS. 4A and 4B modified to include a space-efficient stationary cleaning pad in accordance with the present invention.
Figure 5B:
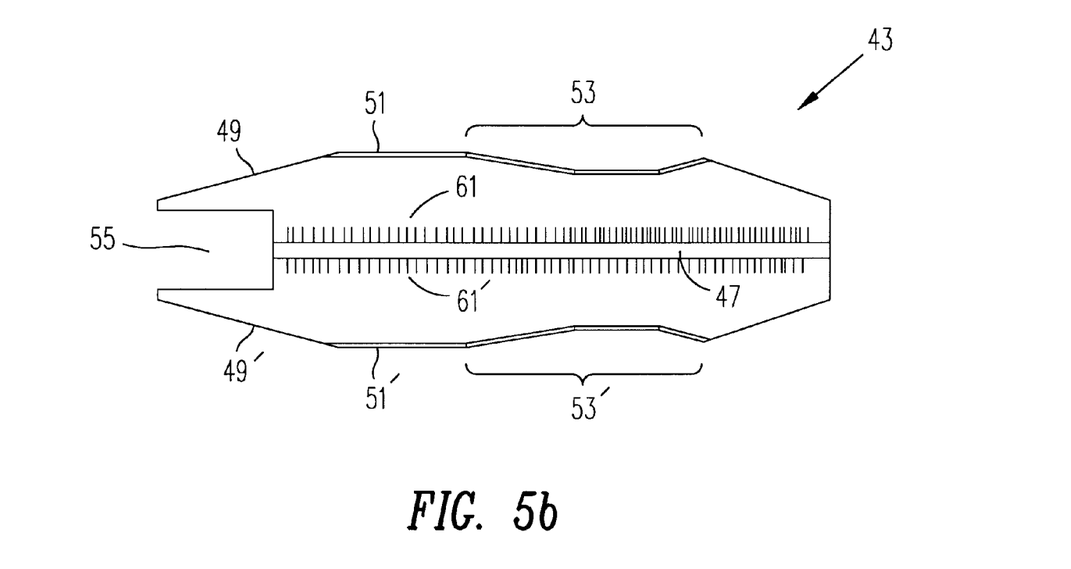

FIGS. 5A, 5B, 6A and 6B show the ramp structure 41 of FIGS. 4A and 4B modified according to the present invention. Referring first to FIGS. 5A and 5B, bristles 61, 61' are provided on each side of limiter 47, e.g. during the injection molding process, or after the ramp structure is formed by gluing a piece of material with bristle-like protrusions onto each limiter 47 surface. When the suspensions 15, 15' move along ramp 43, the air bearing surfaces of sliders 13 and 13' come into contact with bristles 61, 61' which act to brush particles away from these moving surfaces. The bristles are preferably fine enough to reach into all of the ABS crevices of the ABS, strong enough to remove particles they come into contact with, yet soft enough to avoid damage to the transducers 38, 38' and delicate components of suspension 15.

Figure 6A:
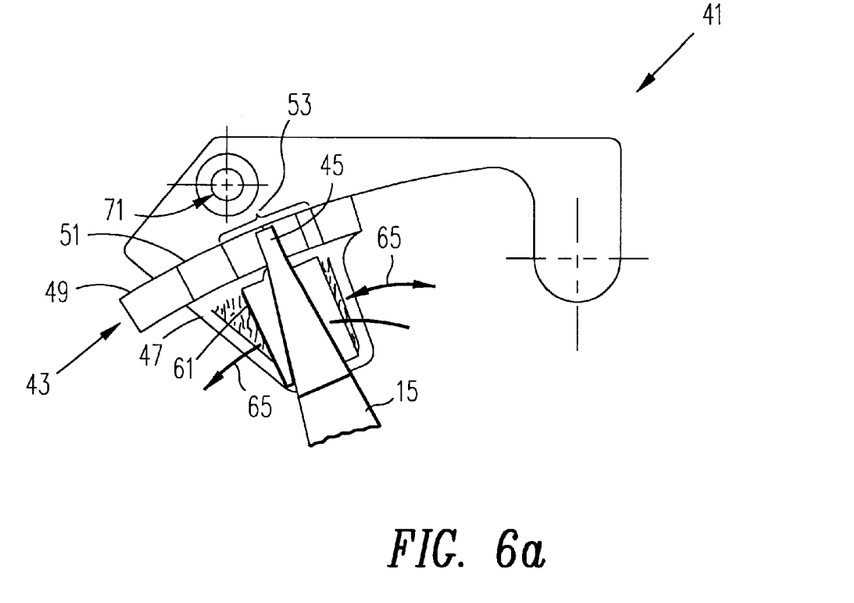
FIGS. 6A and 6B illustrate the relationship between a slider and the cleaning pad of the load/unload structure of FIGS. 5A and 5B during loading and unloading.
Figure 6B:
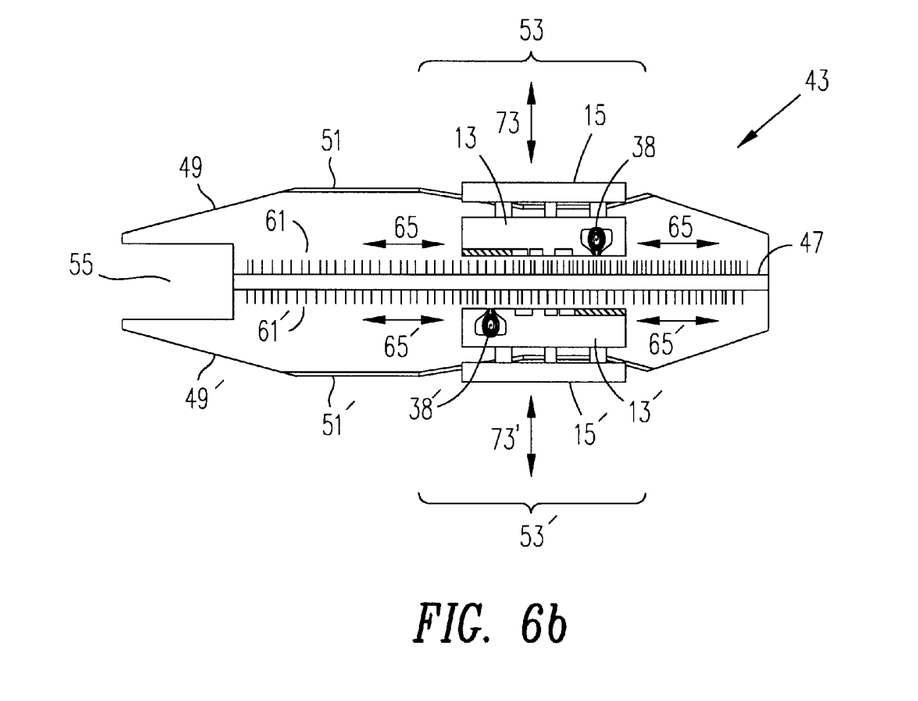
Figure 7:
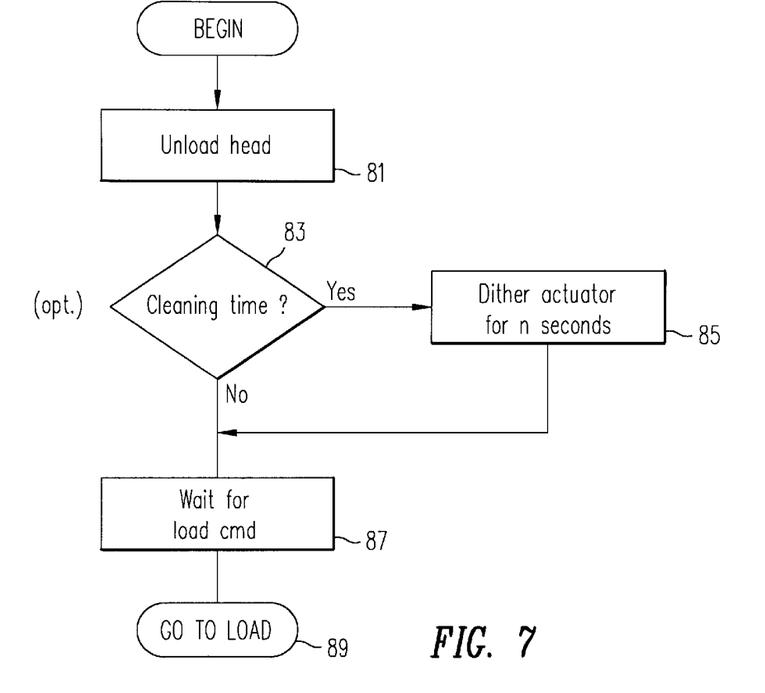
FIG. 7 illustrates a dithering sequence in accordance with the present invention.

Once the suspensions 15, 15' come to rest in detents 53, 53', as shown in FIGS. 6A and 6B, the actuator may then be oscillated or dithered in the direction shown by arrows 65 and 65' and/or the direction shown by arrows 73 and 73' for a selected amount of time to remove additional accumulation from the ABS's. A dithering sequence is shown in FIG. 7 as part of the loading process executed by the servo control system. The operation of servo control systems is well-known in the art, and the modification shown in FIG. 7 should be relatively straightforward to implement in an existing servo systems by those of ordinary skill in the art of actuator control.

In a first step 81, the transducer/slider structures or "heads" are unloaded onto ramps 43 according to conventional procedures. When the suspensions 15, 15' supporting these heads have come to rest in detents 53, 53', the actuator 19 is automatically dithered (step 85), e.g. at a frequency selected to cause motion and excite suspension resonances, and for a time sufficient to cause the removal of additional particles. After dithering, the suspension remains parked until a load command (step 87) is received by the servo controller, at which time control branches to the load sequence (step 89). If it is not desired to perform the dithering sequence every time the heads are unloaded, an optional step 83 may be provided to selectively dither the actuator 19. For example, cleaning may be scheduled to occur only at preselected intervals, or only during the times that the disk is spun down.

Figure 8:
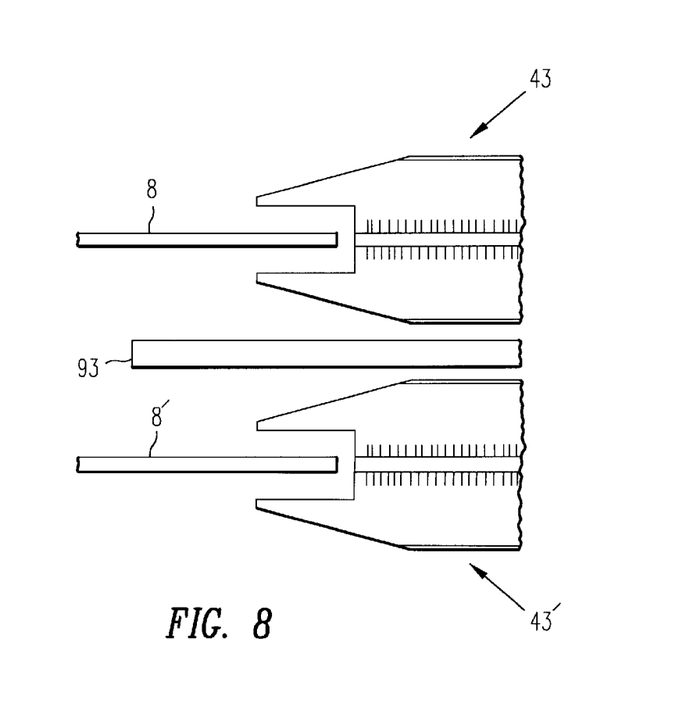
FIG. 8 is represents an embodiment of the baffling used to direct airflow over the cleaning pads in a multiple disk disk drive in accordance with the present invention.

Disk drives typically include one or more filters for filtering the air inside of the disk drive housing. One such filter 91 is shown in FIG. 2. The air is in continuous movement when the disk drive is spinning. To avoid recirculation of contaminants removed by the bristles, baffling may be provided within the disk drive, e.g. as part of the disk enclosure, to channel the airflow over the bristled cleaning surfaces and toward the air filter before the particles have a chance to return to the disk surface. An example of baffling suitable for this purpose is represented by dashed lines 93 in FIG. 2. The baffling may be formed as part of the ramp structure 43 during the injection molding process, for example. In multiple-disk disk drive designs, a baffle 93 may be disposed between the disks 8, 8' and each pair of ramp structures 43, 43' as illustrated in FIG. 8.

The present invention has been described with reference to specific embodiments. However, it will be understood that many modifications and adaptations of the described embodiments may occur to one skilled in the art without departing from the scope of the present invention as set forth in the following claims.

We claim:

1. A disk drive, comprising:
   a rotatable storage disk;
   a slider, including an air bearing surface (ABS) and a transducer for reading information stored on the disk;
   a channel electrically coupled to the transducer for processing the information read from the disk;
   an actuator assembly coupled to the transducer via a suspension for positioning the transducer relative to the disk;
   a load/unload structure disposed at the perimeter of the disk, comprising,
      a load/unload ramp for engaging a distal end of the suspension; and
      a limiter extending from the ramp, including a cleaning surface disposed such that when the distal end of the suspension has engaged the ramp, the cleaning surface comes into contact with the ABS and removes particles therefrom;
   a servo control system for controlling movement of the actuator assembly, wherein the servo control system dithers the slider for at least some of the time when the ABS is in contact with the cleaning surface;

a housing;

an air filter; and a baffle around the disk disposed between a perimeter of the housing and the ramp such that airflow generated by the rotatable disk is directed over the cleaning surface and toward the air filter.

2. The disk drive of claim 1 wherein the baffle is positioned proximate to the load/unload structure.

3. A method for cleaning an air bearing surface (ABS) of a slider supported by a suspension in a disk drive having a baffle, an air filter, and a rotating storage disk, comprising the steps of:

(a) providing a load/unload structure at the perimeter of the storage disk comprising a load/unload ramp for engaging a distal end of the suspension, and a limiter extending from the ramp, including a cleaning surface disposed thereon;

(b) providing the baffle between a housing perimeter of the disk drive and the ramp;

(c) moving the suspension along the ramp such that the cleaning surface comes into contact with the ABS and by the movement removes particles therefrom;

(d) dithering the slider for at least some of the time when the ABS is in contact with the cleaning surface; and (e) directing, with the baffle, airflow generated by the rotating disk over the cleaning surface and toward the air filter.

4. The method of claim 3, wherein step (d) includes the step of selectively dithering the slider for at least some of the time when the ABS is in contact with the cleaning surface.

5. The method of claim 3 wherein the baffle is positioned proximate to the load/unload structure.

* * * * *